United States Patent [19]

Talbert

[11] 4,038,181

[45] July 26, 1977

[54] PROCESS FOR DEWATERING SEWAGE SLUDGE

[75] Inventor: Norwood K. Talbert, Manlius, N.Y.

[73] Assignee: Agway, Inc., Syracuse, N.Y.

[21] Appl. No.: 669,609

[22] Filed: Mar. 23, 1976

Related U.S. Application Data

[63] Continuation-in-part of Ser. No. 526,134, Nov. 22, 1974, abandoned.

[51] Int. Cl.$^2$ ............................................. C02C 3/00
[52] U.S. Cl. .................................... 210/10; 210/18; 210/59; 71/12; 71/28; 71/63
[58] Field of Search ................... 71/12, 28, 30, 63; 210/10, 18, 54 R, 59, 66, 67, 63 R

[56] References Cited

U.S. PATENT DOCUMENTS

| | | | |
|---|---|---|---|
| 2,300,693 | 11/1942 | Oswald | 210/10 X |
| 3,794,582 | 2/1974 | Lackme et al. | 210/63 R X |

Primary Examiner—Frank A. Spear, Jr.
Assistant Examiner—Ferris H. Lander
Attorney, Agent, or Firm—Charles S. McGuire

[57] ABSTRACT

A process for dewatering sewage sludge having a water content on the order of 75% to 95% and previously untreated for the release of such water. The sludge is mixed with a chemical selected from the group consisting of urea and the common ammonium and potassium salts in relative quantities which produce a desired degree of phase separation. The hygroscopic qualities of the chemical operate to remove water from the sludge to form a separate liquid phase of the chemical dissolved in water removed from the sludge, and a solid or semi-solid phase of the sludge solids with any remaining water. The phases may then easily be separated with great simplification of subsequent handling, disposal or further processing of each.

6 Claims, No Drawings

PROCESS FOR DEWATERING SEWAGE SLUDGE

REFERENCE TO THE RELATED APPLICATION

This is a continuation-in-part of copending prior application Ser. No. 526,134 of the same inventor, filed Nov. 22, 1974, now abandoned.

BACKGROUND OF THE INVENTION

The present invention relates to methods of treating sewage sludge having a high initial water content to simplify problems of handling and disposal.

Raw or activated sludge from typical industrial and municipal sewage treatment plants usually contains at least 75% by weight of water. The sludge is a gelatinous, thixotropic substance which makes pumping, or handling by other conventional means, extremely difficult. This complicates the problem of transportation of the sludge to disposal sites.

The disposal itself may present problems of both environmental pollution and of energy consumption. Although both land and water disposal of unprocessed sludge are widely practised as the only viable alternatives presently available, it is generally recognized that they cannot continue indefinitely. Disposal by burning is extremely inefficient due to the enormous quantity of energy required to drive off the water contained by the sludge.

From the foregoing, it is apparent that the major problems associated with both physical handling and disposal of sewage sludges would be minimized by extracting a significant portion of the water initially contained thereby. However, dewatering of the sludge presents further problems, due to the nature of the substance. That is, dewatering by conventional, economical means such as filtration or normal evaporation are impractical since the water is entrapped by the molecular structure of the sludge and the tendency to form a crust which further inhibits air drying.

Chemical treatment of sewage sludges has been advanced as a dewatering method, for example, in U.S. Pat. No. 3,772,191 of Thorn. According to this method, the sludge is first treated with a concentrated mineral acid to reduce the water content to the vicinity of 80%, and then mixed with calcium hydroxide to facilitate further dewatering in a filter press. Other processes which involve contacting sludge solids with other chemicals include those set forth in U.S. Pat. Nos. 3,050,383 of Wilson and 3,758,287 of Scheel. However, these patents are directed primarily to treating or producing other products and utilize sludge which has been previously dewatered by some means to a water content much lower than that of typical fresh sludge.

It is a principal object of the present invention to provide a process for dewatering previously unprocessed sewage sludge to a manageable level by chemical treatment which is efficient and economical, as well as ecologically acceptable.

A further object is to provide a method of processing fresh sewage sludge to significantly reduce the water content thereof in an easy and economical manner to a level facilitating further dewatering by other processes.

Another object is to provide a method of dewatering sewage sludge which allows economical recovery and use of essentially all constituents of the process.

A still further object is to provide a process of chemically treating sewage sludge which yields useful end products with no intermediate or by-products which create environmental pollution problems.

Other products will in part be obvious and will in part appear hereinafter.

SUMMARY OF THE INVENTION

As previously noted, the invention is directed to treatment of previously unprocessed sewage sludges to effect dewatering thereof to a level which permits further handling, disposal and subsequent processing. As used herein, "previously unprocessed" refers to the water content of the sludge, meaning that no significant portion of the water has been removed from the sludge as it is taken from the sewage treatment plant. The sludge may be either raw or activated and of an initial water content of at least 75%.

The invention resides in the treatment of the sludge with a hygroscopic chemical which acts to draw the water from the sludge as the chemical itself dissolves in the water, forming two distinct phases. These may be physically separated simply by draining off the liquid phase of water removed from the sludge containing the dissolved chemical. Specific examples of suitable chemicals, relative quantities, etc., are given in the following description of representative embodiments of the invention. The process is suited for employment on a large scale, continuous flow basis wherein the previously unprocessed sludge is introduced at one end and the dry or most highly concentrated chemical at the other.

DETAILED DESCRIPTION

The chemicals mixed with the sewage sludge to effect the phase separation are either inorganic salts or urea, the latter exhibiting the same hydroscopic, highly soluble properties as the salts which will operate to remove the entrapped water from the sludge. All of the common ammonium and potassium salts are suitable for employment in the invention, examples for which specific data has been obtained being ammonium sulfate, diammonium phosphates and potassium dihydrogen phosphate, as well as urea. Other suitable examples are ammonium sulfite, ammonium nitrate, potassium sulfate, and potassium nitrate.

The relative quantities of the hygroscopic chemicals and sludge will depend upon the initial water content of the sludge and the desired degree of dewatering. Reduction of the water content of the sludge to about 50% yields a product having an appearance and consistency similar to moist black dirt which presents no great problems in handling and disposal. Although treatment according to the present invention does not necessarily reduce the relative water content of the sludge to this level, it does afford an easy and economical means of removing significant quantities of the water initially contained in the fresh sludge, facilitating further processing by means such as those described in aforementioned U.S. Pat. Nos. 3,050,383 and 3,758,287, or in applicant's copending application Ser. No. 647,739.

Specific examples of experiments demonstrating the process of the invention are as follows:

EXAMPLE I 50 gms. of an activated sewage sludge containing 95% water (gelatinous, non-flowable state) was covered with 60 gms. of granular ammonium sulfate and allowed to stand overnight in a sealed container. The dry ammonium sulfate had completely dissolved in water extracted from the sludge and a clear aqueous phase containing 40% of the water contained in the original sludge had separated and was easily decanted from the dewatering sludge.

EXAMPLE II 45 gms. of an activated sewage sludge containing 95% water (gelatinous, non-flowable state) was covered with 25 gms. of granular ammonium sulfate and allowed to stand overnight in a sealed container. The dry ammonium sulfate had completely dissolved in water extracted from the sludge and a clear aqueous phase containing 19% of the water contained in the original sludge had separated and was easily decanted from the dewatered sludge.

In Example I above, dimmonium phosphate, potassium dihydrogen phosphate and urea in dry crystalline form have each been substituted for the ammonium sulfate. The same quantities of chemical and sludge yielded substantially the same degree of phase separation.

As the phase separation progresses the solution of the salt or urea becomes gradually more dilute until the hygroscopic power of the chemical, tending to draw the water from the sludge, are equalled by the water-retaining power of the sludge, and the phase separation is halted. If further phase separation is desired after the dilute liquid phase is drained off, the partially dewatered sludge may be mixed with additional salt or urea in dry form or highly concentrated solution to effect additional dewatering in the same manner.

Rather than repeatedly mixing the sludge, at various stages of dewatering, with chemical, waiting for the phase separation to reach equilibrium and draining off the liquid phase, the process may be carried out in a continuous manner. That is, an appropriate contact vessel having an inlet and an outlet at both ends is provided with fresh, previously unprocessed sludge introduced at one end and the chemical in its most concentrated form (either dry or highly concentrated water solution) at the other end. As the sludge and chemical flow in opposite directions through the vessel, the liquid phase containing the dissolved chemical becomes gradually more dilute and the water content of the sludge decreases. The liquid phase, in its most dilute form, is removed at the end where the fresh sludge is introduced, and the sludge in its dryest or most dewatered form is removed at the end where the most concentrated form of the chemical is introduced. Thus, the fresh sludge initially having the highest water content, and therefore the least water-retaining power, is contacted by the chemical in its weakest solution, having the least water-removing power. Conversely, the chemical at the highest concentration and greatest degree of water-removing power contacts sludge at the lowest water content in the process, with the greatest water-retaining power, thereby achieving maximum efficiency of the process. The final water content of the sludge, whether separation is effected in a continuous or a discrete process, will depend to some extent on the particular composition of the sludge, temperature, and other factors. In any event, the sludge will be dewatered to an extent permitting either immediate disposal in a safe and ecologically acceptable manner, or further treatment and processing will be greatly simplified. Whether the sludge is dewatered fully or only partly to the degree required for disposal in the desired manner, the process is economical and easy to implement.

What is claimed is:

1. A process for dewatering previously unprocessed sewage sludge initially containing at least 75% water comprising:
   a. contacting a quantity of unprocessed sludge with at least as great a quantity, by weight, of a chemical selected from the group consisting of urea and the common salts of ammonium and potassium;
   b. allowing said sludge and chemical to remain in contact for a time sufficient for substantially all of said chemical to dissolve in water extracted thereby from the sludge to produce separation of said sludge and chemical into a liquid phase consisting of said chemical dissolved in water, and a solid or semi-solid phase of sludge solids with any remaining water; and
   c. physically separating said phases by decantation of said liquid phase.

2. The invention according to claim 1 wherein said chemical is in dry crystalline form when mixed with the sludge.

3. The invention according to claim 2 wherein said salts are selected from the group consisting of ammonium sulfate, ammonium sulfite, diammonium phosphate, and potassium dihydrogen phosphate.

4. The invention according to claim 1 wherein said chemical is in concentrated water solution.

5. The invention according to claim 1 wherein said unprocessed sludge and chemical are mutually contacted by thorough mixing thereof in a vessel, and the mixture is allowed to stand in said vessel until separated into said phases.

6. The invention according to claim 1 wherein said sludge and chemical are mutually contacted in a continuous, counter-flow process wherein said unprocessed sludge is introduced at one end and caused to flow in a first direction, and said chemical at its highest concentration is introduced at the opposite end and caused to flow in a direction opposite to said first direction.

* * * * *